Jan. 22, 1963   F. D. LAKINS   3,074,528
WORK RECEIVER FOR BAR WORKING MACHINES
Filed Sept. 8, 1960   3 Sheets-Sheet 3
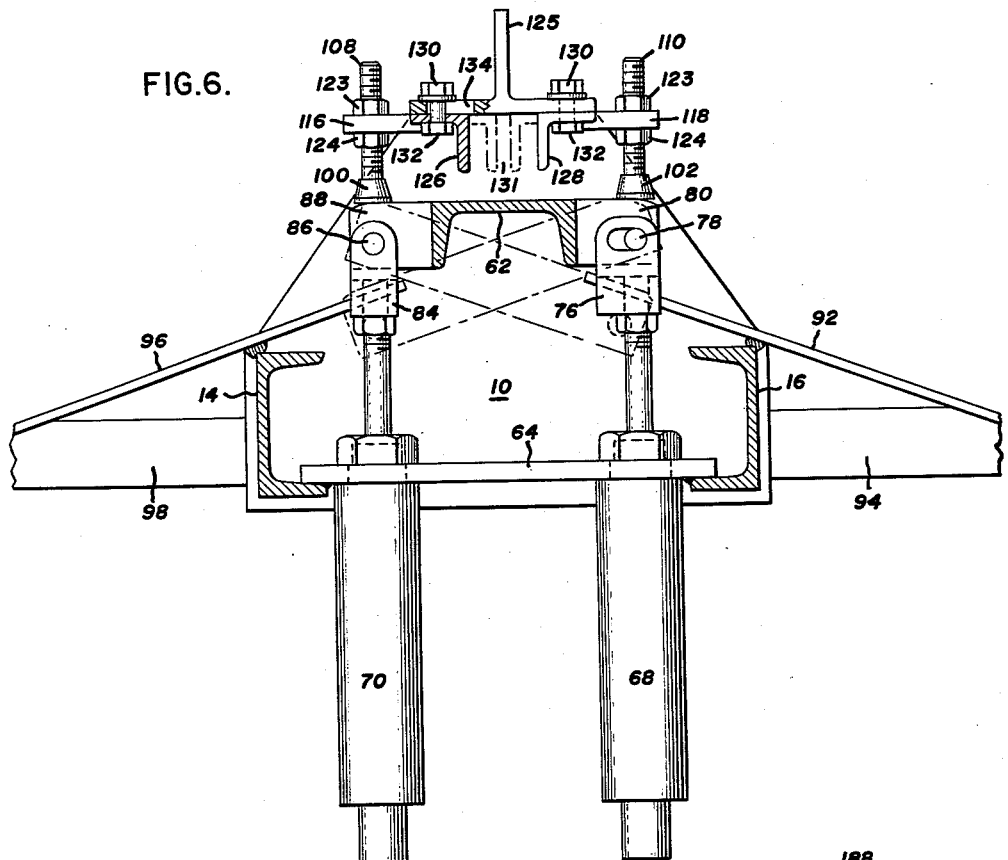
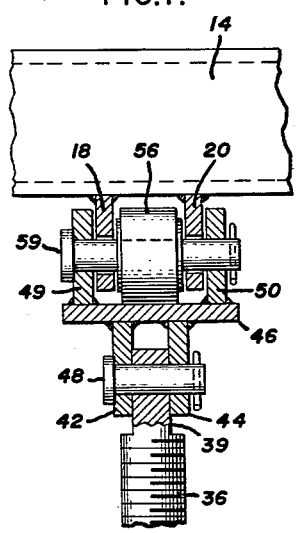
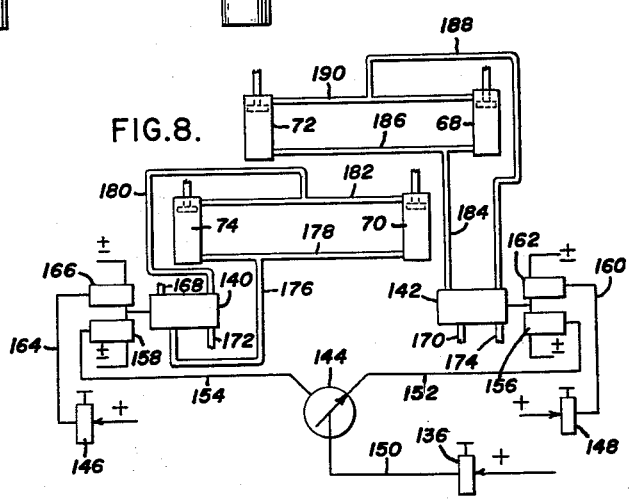
INVENTOR:
FRANKLIN D. LAKINS,
BY *D. Emmett Thompson*
HIS ATTORNEY

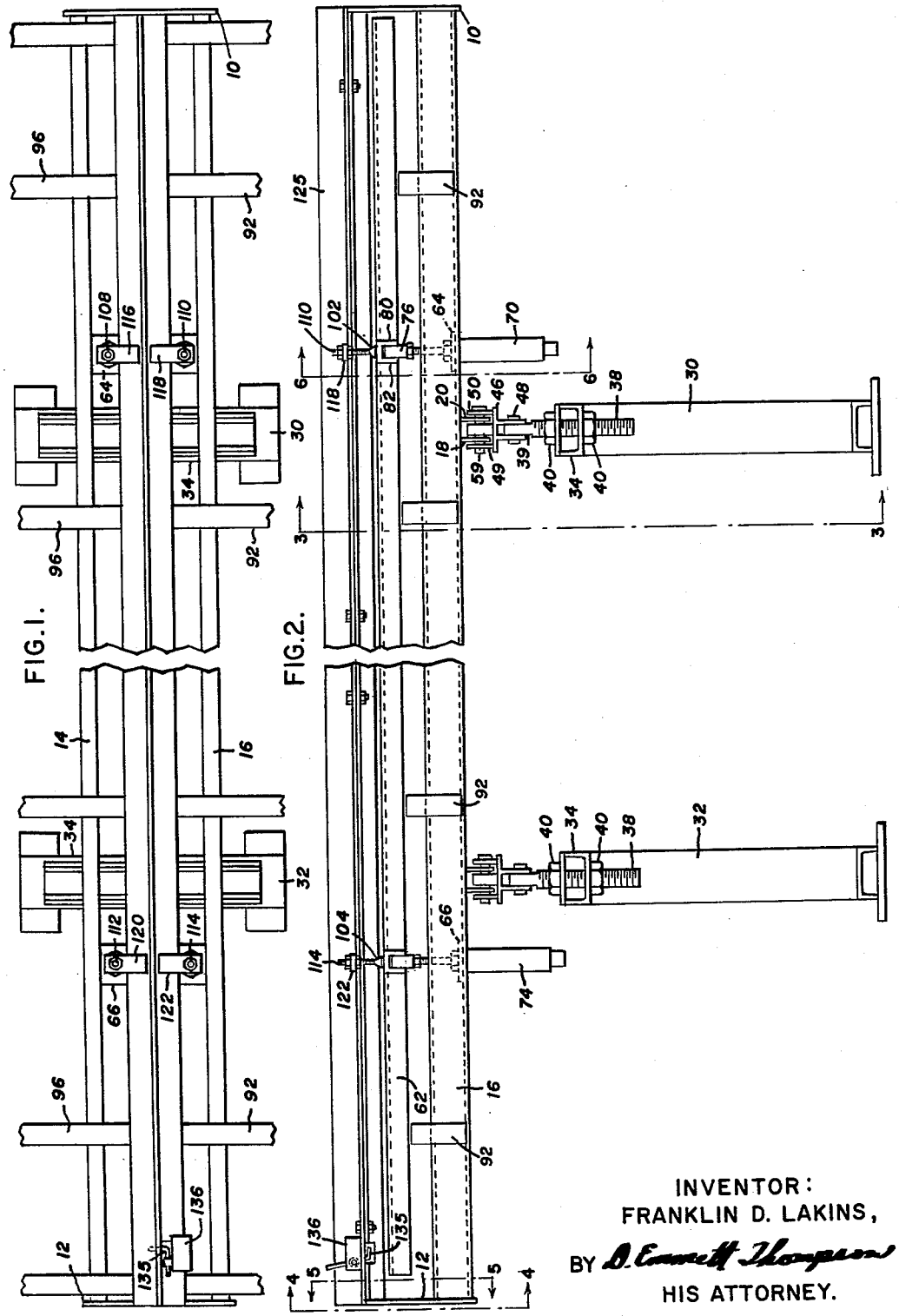

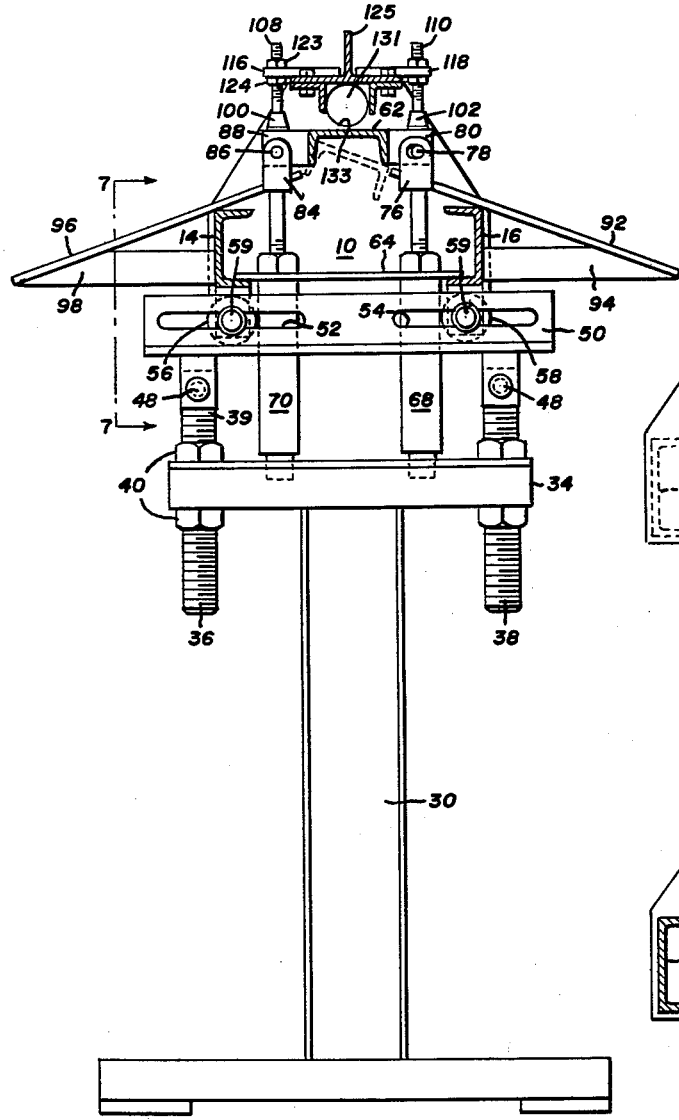
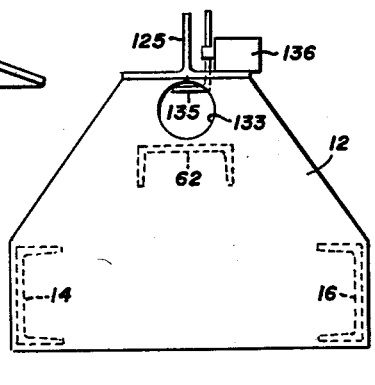
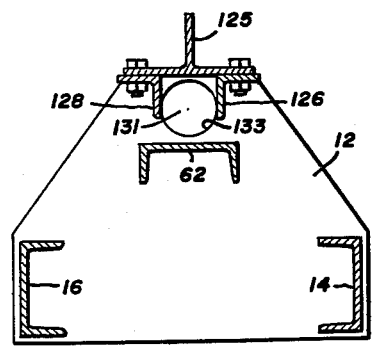

United States Patent Office 3,074,528
Patented Jan. 22, 1963

3,074,528
WORK RECEIVER FOR BAR WORKING MACHINES
Franklin D. Lakins, Syracuse, N.Y., assignor to Lipe-Rollway Corporation, Syracuse, N.Y., a corporation of New York
Filed Sept. 8, 1960, Ser. No. 54,798
5 Claims. (Cl. 193—39)

This invention relates to and has as an object a new and improved work receiving and discharging machine for use in connection with bar working machines.

For example, when bar stock is to be ground by a centerless grinder it is oftentimes necessary to make several passes of the bar stock is to be ground by a centerless grinder it is oftentimes necessary to make several passes of the bar stock through the grinding machine to achieve the desired finish or dimension. In such an operation several pieces of bar stock are fed continuously through the centerless bar grinding machine, one after another so that there is no appreciable delay or space between the completion of the grinding pass upon one bar stock before the next piece begins to emerge from the grinding machine. In such an operation a work receiving machine must be positioned in axial alignment with the grinding machine to receive the ground bar stock as it emerges from the grinding machine. Since, as set forth above, it may be necessary to pass certain of the individual pieces of bar stock through the grinding machine again, it is necessary that the work receiving machine be operable so as to selectively discharge the work pieces to one side or the other according to whether the pieces are finished or need additional machining.

Accordingly, it is a more specific object of this invention to provide a new and improved work receiving and discharging machine wherein the work received by the machine may be selectively discharged at the will of the operator, and wherein such discharge will not interfere with the entrance of the next successive work piece into the work receiving machine.

The invention resides in the novel features and in the combinations and constructions hereinafter set forth and claimed.

In describing this invention reference is had to the accompanying drawings in which like characters designate corresponding parts in all the views:

In the drawings:

FIGURE 1 is a top plan view of a preferred embodiment of the invention.

FIGURE 2 is a side elevational view of the machine shown in FIGURE 1.

FIGURE 3 is a cross-sectional view taken on line 3—3 of FIGURE 2.

FIGURE 4 is a view taken looking in the direction of the arrows of line 4—4 on FIGURE 2.

FIGURE 5 is a cross-sectional view taken on line 5—5 on FIGURE 2.

FIGURE 6 is a fragmentary cross-sectional view taken looking in the direction of the arrows of line 6—6 on FIGURE 2.

FIGURE 7 is a fragmentary side-sectional view taken on the line 7—7 on FIGURE 3.

FIGURE 8 is a schematic illustration of a control system for the invention.

In FIGURE 1 the machine is made up of a frame comprising a pair of end plates 10, 12, which are welded to a pair of side channel shaped members 14, 16, a pair of depending ears 18, 20 (see FIGS. 2, 3 and 7) are suitably affixed to the side members as by welding or the like for a purpose to be hereinafter described.

A pair of pedestals or stands 30, 32, support the frame in the following manner. As seen in FIGURES 2 and 3, each of the pedestals is provided, at its upper end, with a cross member 34, made up of an inverted channel member and a top plate. A pair of threaded bolts 36, 38, extend through suitable apertures formed in the top member 34, and the bolts are affixed to the top member 34, in the desired position of vertical adjustment by nuts 40. The end portion 39, of the bolts 36, is flattened and provided with an aperture. The flattened portion 39, is received between a pair of depending ears 42, 44, suitably affixed to the underside of a plate 46. The bolt is retained between the ears 42, 44, by means of a pin 48, which extends through the ears and the aperture formed in the flattened portion 39, of the bolt 36. Mounted on each side of the plate 46, by any suitable means, such as welding or the like and extending upwardly therefrom, are a pair of rails 49, 50.

As best seen in FIGURE 3 the rails 49, 50, are formed with a pair of spaced apart elongated apertures or slots, 52, 54. A pair of rollers 56, 58, are received on the platform 46 between the depending ears 18, 20, and the rails 49, 50, and the rollers 56, 58, are maintained therein by means of a pin 59, passing through the rails 49, 50, ears 18, 20, and the rollers 56, 58, whereby the entire frame is free to move horizontally on the pedestals 30, 32.

A work receiving table 62, made up of an inverted channel shaped member, is mounted for both clockwise and counterclockwise oscillation between the end plates 10, 12, by the structure to be next described. At a pair of spaced points along the frame, a pair of plates 64, 66, are fixed between the side members 14, 16, and are suitably apertured to fixedly receive the single-ended double acting cylinders 68, 70, 72 and 74. The cylinders 68, 72, are connected by means of clevis brackets 76, and pins 78 to a pair of arms 80, 82 (see FIGURE 2), extending outwardly from and affixed to the work supporting table 62, whereby the right-side of the table 62, see in FIGURE 6, is pivotally connected to the rods of the cylinders 68, 72. In like manner, arms 88 on the opposite side of the table 62 are pivotally connected, by means of the clevis brackets 84, and pins 86, to the rods of cylinders 70 and 74, to pivotally support the lefet side of the table 62, as viewed in FIGURE 6.

As will be obvious when the air is exhausted from the bottom of the cylinders 68, 72, and air is supplied to the top of these cylinders, the cylinder rods will retract and the table 62 will oscillate about the pivotal connection between the arms 88, and the clevis brackets 84, on the opposite side of the table 62. This permits the stock or work piece carried by the table 62 to be discharged onto a plurality of roll-off shelves or ramps 92, spaced along the frame between the end plates 10, 12, and welded at their undersides to side member 16, and affixed at the underside of their outer ends to the support arms 94, which are welded to the member 16. Similarly, when the air is exhausted from the bottom of the cylinders 70, 74, and supplied to the top of these cylinders the table 62 is oscillated in a counterclockwise direction about the pivotal connection between the clevis brackets 76, and the arms 80, 82, on the opposite side of the table 62, to permit the work piece or stock supported on the table to be discharged onto the roll-off shelves or ramps 96, which are also spaced along the frame between the end plates 10, 12, and are supported by the side member 14, and arms 98. The ramp 92, may be for work pieces which need additional machines while the ramp 96, may be for work pieces which are finished.

To permit both the clockwise and counterclockwise oscillation of table 62, the clevis brackets 84, are provided with elongated slots in which the pins 86, are received to provide the necessary lost motion connection.

When the air is supplied to the bottoms of cylinders 68 through 74 inclusive, the upward movement of the table 62, is limited by a plurality of stop feet 100, 102, 104 and 106. The stop feet are carried on the ends of bolts 108, 110, 112 and 114, which are received in the outer ends of the arms 116, 118, 120 and 122. The bolts 108 through 114 inclusive are maintained in vertical adjustment in the arms 116 through 122 inclusive, by means of the nuts 123, 124, on each of the bolts. This provides a method of adjusting the vertical location of the table 62, as will be obvious. The arms 116 through 122 inclusive, are suitably affixed by welding or the like, to the upper side of an inverted T shaped member 125, suitably affixed to, and received between, end plates 10, 12. The member 125 has a pair of angle members 126, 128, affixed to its underside and depending therefrom by means of a plurality of bolts 130, and nuts 132. The bolts 130, are received in elongated apertures 134, formed in the bottom portion of the T shaped member 125, whereby the angle members 126, 128, may be horizontally adjusted on the member 125, as is indicated by the dashed lines. The members 125, 126 and 128, form a guide channel 130, which co-operates with the work supporting table 62, to receive and support the work piece on the table 62.

As best seen in FIGURES 4 and 5, the end plate 12 is provided with an aperture 131, the center line of which is aligned with the center line of the work in the bar working machine so that as the bar working machine feeds the work forwardly it will enter the discharge unit through the aperture 131. The work supporting table 62, is best seen in FIGURE 5, is positioned so as to be a spaced distance below the inner diameter of the discharge tube of the bar working machine. This is so in order that when the work piece has completely entered the discharge unit it will drop a perceptible distance onto the work supporting table 62.

In FIGURE 4 the actuator 134, of a sensing switch 136, is positioned in the path of movement of the bar stock entering the discharge unit so that when the work piece has completely entered the discharge unit and has dropped onto the work supporting table 62, the actuator 134, which has been held open by the bar stock entering the unit, momentarily closes, thus initiating a discharge cycle through the control system of the machine.

A schematic illustration of one form of the control system for the machine is shown in FIGURE 8. The control system includes a pair of four-way solenoid actuated valves 140, 142, a selector switch 144 to control the actuation of the respective valves 140, 142, and a pair of limit switches 146, 148. The sensing switch 136 is connected by line 150 to the selector switch 144, which is manually operable to connect the line 150 to either of the lines 152 and 154, depending upon which side of the machine it is desired to have receive the discharged work piece.

Line 152 is connected to a solenoid 156 for operating the valve 142, while line 154 is connected to a solenoid 158 for operating the valve 140. Similarly, the limit switch 148 is connected by line 160 to a second solenoid 162 for reversely operating the valve 142, and the limit switch 146 is connected by a line 164 to a second solenoid 166 for reversely operating the valve 140.

The valve 140 and the valve 142, each are connected to a source of fluid under pressure, generally indicated by the reference numerals 168 and 170, and each of these valves also has an atmospheric exhaust line 172, 174, respectively. The valve 140 is connected by lines 176, 178, to the bottoms of cylinders 70 and 74, and the valve is also connected by lines 180, 182, to the tops of these cylinders. In like manner the valve 142 is connected by lines 184, 186, to the bottoms of cylinders 68 and 72, and the valve is also connected by lines 188, 190, to the tops of these cylinders.

In operation, if it is desired to have a bar received on the table discharged to the right-hand side of the machine, as viewed on FIGURE 3, the selector switch 144 is set so as to connect the line 150 to the line 152, as illustrated in FIGURE 8. In this position when the work piece has fully entered the machine the switch 136 will be closed by the actuator 134, as previously described, thereby completing a circuit through the lines 150, 152, to the solenoid 156 of valve 142. This electrical circuit serves to energize the solenoid so as to actuate the valve in a manner whereby the source of fluid under pressure in line 170 is connected to line 188, thereby introducing the fluid under pressure into the top of the cylinders 68 and 72, via the line 190. At the same time, the bottoms of these cylinders are connected by lines 186, 184, to the atmospheric exhaust line 174 by the actuation of the valve 142, so as to move the piston rods of these cylinders downward in the cylinder. This movement, as previously described, pivots the work table 62 about the clevis pins 86 so as to discharge the work piece of the right, as shown in FIGURE 3, on to the discharge ramps 92. When this discharge operation has been completed the limit switch 148, which may be positioned in the path of movement of the table 62, is actuated so as to complete a circuit through the line 160 to energize the solenoid 162. The energization of the solenoid 162 serves to return the valve 142 to the normal position in which the line 170 is connected to the line 184 and the line 188 is connected to the line 174. This serves to introduce the fluid under pressure into the bottom of the cylinders 68, 72, through the line 186 while exhausting the top of the cylinders through the line 190, thus returning both piston rods to their uppermost position, thereby returning the table 62 to its upper position in which the adjustable stop feet 102 limit the upward movement of the table 62. This is the normal condition of the cylinder 142 and the connection of the pressure line 170 to the line 184 through the valve 142 serves to maintain the lefthand side of the table 62 in its upper position.

In like manner, when the selector switch 144 is operated so as to connect the lines 150, 154, the entrance of a work piece into the machine so as to actuate the switch 136 will cause the work piece to be discharged to the left, as viewed in FIGURE 3, on to the ramps 96.

The control system shown in FIGURE 8, is purely schematic and it is to be understood that the circuits described for the selector switch 136 and the limit switches 146, 148 to the respective solenoids 156, 158, 162, 166, are complete electrical circuits including a power source having the normal hot and common lines as is indicated in the figure.

Consequently, it will be seen that the operator of the bar working machine may, by use of the machine comprising this invention, manually select the side on which a work piece fed into the discharge unit will be discharged. That is, if a particular work piece needs additional machining or working the operator may discharge the work piece onto the ramps 92 beneath which may be positioned a suitable conveyance for returning the work piece to the bar working machine for the additional working. If, however, a particular work piece is deemed by the operator to be finished he may control the discharge machine so as to discharge that work piece on to the ramps 96, beneath which may be placed a suitable conveyance for receiving finished work pieces. In either case, the discharge of the work piece from the unit will not interfere with the next piece of work being fed into the unit since the table 62 in the discharge operation falls away from the centerline of the discharge unit and the centerline of the work being fed into the unit. The discharge unit may be suitably connected to the bar working machine in any desired manner so as to limit the movement of the entire frame which, as previously described, is carried by the rollers 56, 58, on the platform 46

What I claim is.:
1. A discharge unit in substantially abutting relationship for receiving and discharging work pieces continuously fed into said unit by a bar working machine, said unit including a table positioned to receive work pieces fed out of said bar working machine, said table being car- ried by a frame, means supporting said table for oscillation from a work receiving to a work discharging position, said means being selectively operable to permit both clockwise and counterclockwise oscillation of said table, said oscillation taking place about axes positioned so as to discharge said work pieces without interfering with the infeed of the next abutting work piece.

2. The discharge unit of claim 1, wherein guide means are fixedly carried by said frame to position said work pieces on said table and means carried by said guide means to sense the completion of feed of a work piece onto said table.

3. A discharge machine for receiving and selectively discharging work pieces from a bar working machine, comprising a frame including a pair of upstanding end plates, a work table received between said end plates, means carried by said frame for supporting said table, said means being selectively operable to permit oscillation of said table about a pair of axes located below and to the side of the center line of said table surface so as to effect discharge of work pieces received on said table to each side of said machine without interferring with the infeed of the next work piece and means for adjusting said table horizontally and vertically.

4. A machine for receiving work continuously fed into said machine by a bar working machine and discharging said work without interfering with the infeed of the next successive work piece comprising a frame, a work receiving table, means carried by said frame for supporting said table for clockwise and counterclockwise oscillation to discharge a workpiece received on said table, said oscillation taking place about a pair of axes located below and adjacent the side edges of said table.

5. The machine of claim 4, wherein means are carried by said frame for guiding said workpieces onto said table and means are provided for adjusting the work supporting position of said table.

References Cited in the file of this patent
UNITED STATES PATENTS

| | | |
|---|---|---|
| 2,445,950 | Jennings | July 27, 1948 |
| 2,952,348 | Buchholz | Sept. 13, 1960 |

UNITED STATES PATENT OFFICE
CERTIFICATE OF CORRECTION

Patent No. 3,074,528              January 22, 1963

Franklin D. Lakins

It is hereby certified that error appears in the above numbered patent requiring correction and that the said Letters Patent should read as corrected below.

Column 1, lines 14 to 16, strike out "is to be ground by a centerless grinder it is oftentimes necessary to make several passes of the bar stock"; column 2, line 41, for "lefet" read -- left --.

Signed and sealed this 27th day of August 1963.

(SEAL)
Attest:

ERNEST W. SWIDER                     DAVID L. LADD
Attesting Officer                       Commissioner of Patents